(12) United States Patent
Lv et al.

(10) Patent No.: US 9,025,518 B2
(45) Date of Patent: May 5, 2015

(54) WIRELESS COMMUNICATION NETWORK, COMMUNICATION METHOD AND NODE USED IN WIRELESS COMMUNICATION NETWORK

(75) Inventors: Chao Lv, Beijing (CN); Jun Tian, Beijing (CN); Hao Wang, Beijing (CN); Cheng Li, Beijing (CN)

(73) Assignee: Fujitsu Limited, Kawasaki (JP)

( * ) Notice: Subject to any disclaimer, the term of this patent is extended or adjusted under 35 U.S.C. 154(b) by 92 days.

(21) Appl. No.: 13/220,328

(22) Filed: Aug. 29, 2011

(65) Prior Publication Data

US 2012/0051354 A1    Mar. 1, 2012

(30) Foreign Application Priority Data

Aug. 30, 2010   (CN) .......................... 2010 1 0273593

(51) Int. Cl.
*H04W 40/24* (2009.01)
*H04L 12/721* (2013.01)
*H04W 72/04* (2009.01)

(52) U.S. Cl.
CPC ........ *H04W 40/246* (2013.01); *H04W 72/0453* (2013.01); *H04L 45/26* (2013.01)

(58) Field of Classification Search
CPC ..... H04W 88/04; H04W 80/04; H04W 84/08; H04W 84/12
USPC ........... 370/338, 315, 327, 328, 348; 455/445
See application file for complete search history.

(56) References Cited

U.S. PATENT DOCUMENTS

2004/0022224 A1    2/2004   Billhartz
2005/0030921 A1*   2/2005   Yau ............................... 370/329
(Continued)

FOREIGN PATENT DOCUMENTS

CN       1620787 A      5/2005
CN       1820465        8/2006
(Continued)

OTHER PUBLICATIONS

Chinese Office Action mailed Oct. 31, 2013 in corresponding Chinese Patent Application No. 201010273593.0.
(Continued)

*Primary Examiner* — Ian N Moore
*Assistant Examiner* — Hien Nguyen
(74) *Attorney, Agent, or Firm* — Staas & Halsey LLP (57) ABSTRACT

A wireless communication network, a communication method and a node for the wireless communication network are disclosed. The wireless communication network includes a plurality of peer nodes communicating with each other through a control channel and a plurality of data channels. The communication method may include: transmitting available data channel information via a routing request signal; modifying available data channel information received by the source node or the other intermediate nodes, and transmits the modified available data channel information via a routing request signal; determining an agreed data channel for communication between the destination node and the source node or between the destination node and the intermediate node, according to the available data channel information transmitted from the source node or the intermediate node; and notifying an intermediate node as a previous hop and/or the source node of an identification of the agreed data channel via a routing response signal.

8 Claims, 3 Drawing Sheets

(56) References Cited

U.S. PATENT DOCUMENTS

| | | | |
|---|---|---|---|
| 2006/0165114 A1 | 7/2006 | Diepstraten et al. | |
| 2007/0133590 A1 | 6/2007 | Chun et al. | |
| 2008/0095102 A1 | 4/2008 | Meng et al. | |
| 2008/0144498 A1 | 6/2008 | Chung et al. | |
| 2008/0268855 A1* | 10/2008 | Hanuni et al. | 455/445 |
| 2009/0129323 A1* | 5/2009 | Chen et al. | 370/329 |
| 2010/0020770 A1 | 1/2010 | Qin et al. | |

FOREIGN PATENT DOCUMENTS

| | | |
|---|---|---|
| CN | 101345579 | 1/2009 |
| CN | 101494591 A | 7/2009 |
| CN | 101568164 A | 10/2009 |
| CN | 101697635 | 4/2010 |
| JP | 2005-535234 | 11/2005 |
| JP | 2008-66861 | 3/2008 |
| JP | 2012-501145 | 1/2012 |
| WO | WO 2010/023601 A2 | 3/2010 |

OTHER PUBLICATIONS

Chinese Office Action mailed Jul. 17, 2014 in corresponding Chinese Application No. 20100273593.0.

Office Action mailed Jan. 27, 2015 for corresponding Japanese Patent Application No. 2011-186474.

* cited by examiner

| Frame control (2) | Source ID (6) | Destination ID (6) | Queue ID (1) | Data Channel (3) | Hop Count (1) | FCS (1) |

Fig.3

| Frame control (2) | Source ID (6) | Destination ID (6) | Queue ID (1) | Agreed Channel ID (1) | Hop Count (1) | FCS (1) |

WIRELESS COMMUNICATION NETWORK, COMMUNICATION METHOD AND NODE USED IN WIRELESS COMMUNICATION NETWORK

CROSS REFERENCE TO RELATED APPLICATIONS

This application claims the benefit of Chinese Application No. 201010273593.0, filed Aug. 30, 2010, the disclosure of which is incorporated herein by reference.

FIELD

The disclosure relates to wireless communication technique, particularly to a communication method used in a wireless communication network and a node used in the wireless communication network.

BACKGROUND

Multi-channel communication has been proved to greatly improve the performance of a communication system. And in IEEE 802.11 standard, available frequency band is divided into a plurality of frequency points for choices by the user.

In the available multi-channel assignment method, generally channel assignment is coordinated by a distributed algorithm between nodes. The method is disadvantageous in that the control information overhead is large.

Therefore, the communication method for wireless communication network which supports multi-channel communication still needs to be improved, in order to reduce the control information overhead.

SUMMARY

A brief outline of the disclosure is given hereinafter, to provide a basic understanding of some aspects of the disclosure. It should be understood that the outline is not an exhaustive one of the disclosure. It is not intended to decide key part or important part of the disclosure, or define a scope of the disclosure. It simply provides some concepts in a simplified form, as a preface for a more detailed description discussed later.

It is at least an object of the disclosure to provide a wireless communication network, a communication method for the wireless communication network and a node for the wireless communication network, which can at least overcome part of the disadvantages and shortcomings in the above prior arts and reduce the control information overhead.

In order to achieve the above object, according to one embodiment of the disclosure, a communication method used in a wireless communication network is provided. The wireless communication network includes a plurality of peer nodes, the plurality of nodes may communicate with each other through a control channel and a plurality of data channels. The communication method may include: transmitting, by a source node among the plurality of nodes, available data channel information via a routing request signal; modifying, by an intermediate node among the plurality of nodes, available data channel information received by the source node or the other intermediate nodes, and transmits the modified available data channel information via a routing request signal; determining, by a destination node among the plurality of nodes, an agreed data channel for communication between the destination node and the source node or between the destination node and the intermediate node, according to the available data channel information transmitted from the source node or the intermediate node; and notifying, by the destination node and/or the intermediate node, an intermediate node as a previous hop and/or the source node of an identification of the agreed data channel via a routing response signal.

In order to achieve the above object, according to another embodiment of the disclosure, a node used in a wireless communication network is provided. The wireless communication network includes a plurality of peer nodes, the plurality of nodes communicate through a control channel and a plurality of data channel. The node includes: an available data channel information transmission unit configured for transmitting available data channel information via a routing request signal; an available data channel information modification unit configured for modifying available data channel information received by a source node or an intermediate node, and transmitting the modified available data channel information via a routing request signal; an agreed data channel determination unit configured for determining an agreed data channel for the communication between a destination node and a source node or between a destination node and an intermediate node, according to the available data channel information received from the source node or the intermediate node; and an agreed data channel notification unit configured for notifying an intermediate node as a previous hop and/or the source node of an identification of the agreed data channel via a routing reply signal.

In order to achieve the above object, according to another embodiment of the disclosure, a wireless communication network is provided. The wireless communication network includes a plurality of above mentioned nodes that are peer with each other.

According to the embodiment of the disclosure, the control information overhead in communication in the wireless communication network is relatively small.

These and other advantages of the disclosure will be more apparent through the following detailed description of the best embodiment of the disclosure with reference to the accompanying drawings.

BRIEF DESCRIPTION OF THE DRAWINGS

The disclosure may be better understood with reference to the following description given in connection with the accompanying drawings, in which the same or similar reference numerals are used to represent same or similar parts. All the accompanying drawings together with the following detailed description are included in the specification and form a part of the specification, and are further used to exemplify the preferable embodiments of the disclosure and explain the principle and advantages of the disclosure. In the accompanying drawings.

Those skilled in the art should understand that elements in the accompanying drawings are shown merely for simplicity and clarity, may not necessarily drawn in scale. For example, some elements in the drawings may be enlarged in size compared with other elements, to facilitate understanding of the embodiment of the disclosure.

DETAILED DESCRIPTION

The illustrative embodiment of the disclosure will be described in detail in connection with the accompanying drawings in the following. For clearness and simplicity, not all features of the actual embodiments are described in the description. However, it should be understood that many decisions specific to the embodiments must be made in the process of developing any such actual embodiments, to achieve a specific object of the developers, such as compliance with those restrictions related with system and business, which may change according to different embodiments. Furthermore, it should be understood that though the developing work may be very complex and time consuming, but for those skilled in the art benefiting from the disclosure of the disclosure, the developing work are merely routine task.

Here, it should be noted that in order to avoid the disclosure from being blurred by unnecessary details, in the accompanying drawings and description only device structures and/or processing steps closely related to the scheme according to the disclosure are described, and the representation and description for the part and processing those skilled in the art already know, which also haven't much thing to do with the disclosure, are omitted.

Figure 1:
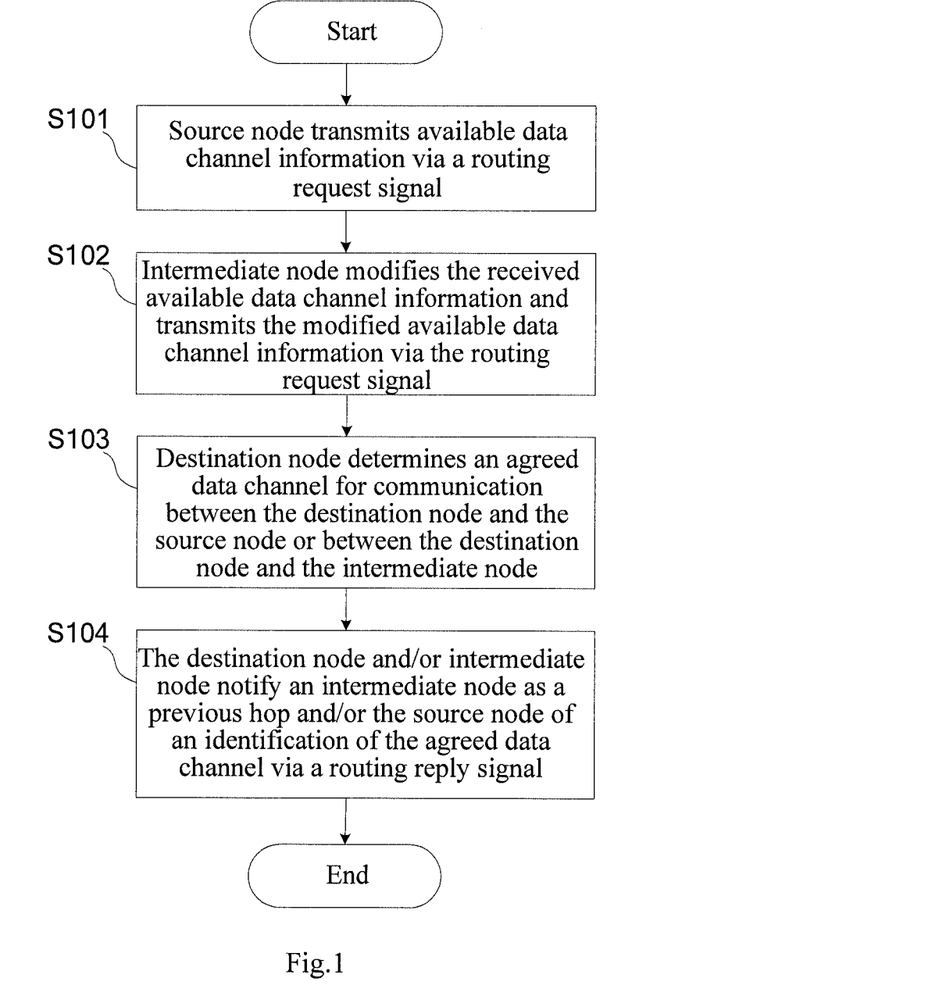
FIG. 1 illustrates a communication method used in a wireless communication network according to an embodiment of the disclosure.

FIG. 1 illustrates a schematic view of a communication method used in a wireless communication network according to an embodiment of the disclosure. The wireless communication network includes a plurality of peer nodes which communicates with each other through a control channel and a plurality of data channels.

As shown in FIG. 1, the communication method used in the wireless communication network according to the embodiment of the disclosure starts from step S101.

In step S101, a source node among the plurality of nodes transmits available data channel information via a routing request signal.

In step S102, an intermediate node among the plurality of nodes modifies available data channel information received by the source node or other intermediate nodes, and transmits the modified available data channel information via a routing request signal.

In step S103, a destination node among the plurality of nodes determines an agreed data channel for communication between the destination node and the source node or between the destination node and the intermediate node, according to the available data channel information received from the source node or the intermediate node.

In step S104, the destination node and/or the intermediate node notifies an intermediate node as a previous hop and/or the source node of an identification of the agreed data channel via a routing reply signal.

In the embodiment, the control channel is mainly used to transmit control information, such as a routing request/reply signal, a handshaking signal, etc. Under the coordination of the control signal, different channel may be used for different link. The control channel may be a default channel for all nodes.

In an example, when the source node needs to communicate with the destination node, the source node may initiate a routing discovery process, that is, the source node may locate corresponding routing by broadcasting a routing request signal. The routing request signal may be referred to as MRREQ (Multi-channel Route Request) signal. When the MRREQ arrives at the destination node itself, the routing may be determined. The destination node or the intermediate node may return the routing reply signal along the chosen route to notify the source node of the routing process which enables arrival at the destination node. The routing reply signal may be referred to as MRREP (Multi-channel Route Reply) signal.

Figure 3:
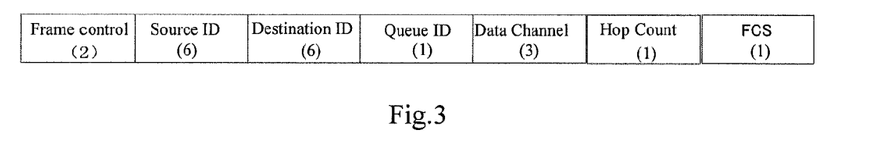
FIG. 3 illustrates an illustrative MRREQ (multi-channel routing request signal) frame format used in a communication method used in a wireless communication network according to the embodiment of the disclosure.

FIG. 3 illustrates an illustrative MRREQ frame format used in the communication method used in the wireless communication network according to the embodiment of the disclosure. As shown in FIG. 3, MRREQ includes the following fields: a frame control field, including 2 bytes and indicating such information as type of a frame; a source ID field, including 6 bytes and identifying a source node; a destination ID field, including 6 bytes and identifying a destination node; a queue ID field, including 1 byte which is an identification of a queue; a data channel field, including 3 bytes and indicating information of the data channel; a hop counting field, including 1 byte and indicating a hop count from a source node to a current node; and FCS which is a frame check sequence and includes 1 byte. The data channel field may include channel status information and a channel weighted value information.

In an example, the data channel field may include channel status information of 12 bytes and channel priority index value of 12 bytes. The channel status information of 12 bytes may indicate status of 12 data channels, namely active state or positive state. In addition, the relationship between the 12 bytes and data channels is predetermined. The channel priority index value of 12 bytes may indicate a priority index value of 4 channels, each channel priority index value is indicated by 3 bytes. The 4 channel may be 4 available data channel at the beginning of the channel status information.

In another example, the data channel field may include an identification of available data channel and a priority index value of available data channel.

Figure 4:
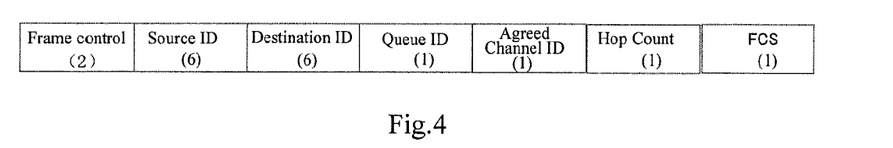
FIG. 4 illustrates an illustrative MRREP (multi-channel routing reply signal) frame format used in a communication method used in a wireless communication network according to the embodiment of the disclosure.

FIG. 4 shows an illustrative MRREP frame format used in a communication method used in a wireless communication network according to the embodiment of the disclosure. According to FIG. 4, MRREP includes the following fields: a frame control field, including 2 bytes and indicating such information as a type of a frame; a source ID field which includes 6 bytes and is used to identify a source node; a destination ID field which includes 6 bytes and is used to identify a destination node; a queue ID field which includes 1 byte and is an identification of a queue; a reserved channel ID field which includes 3 bytes and identifies a reserved channel between a destination node and a source node or between a destination node and an intermediate node; a hop counting field, including 1 is byte and indicating a hop count from a source node to a destination node; and FCS which is a frame check sequence and includes 1 byte.

It should be understood that the frame formats of MRREQ and MRREP used in the embodiment of the disclosure are not limited to those shown in FIG. 3 and FIG. 4. Some fields may be added, reduced or modified. For example, the length of a field may be different from those in FIG. 3 and FIG. 4. For example, the frame format in the embodiment of the disclosure may be as follows: adding the above mentioned data channel field or the reserved channel ID field respectively on the basis of the frame format of RREQ and RREP of AODV (Ad-hoc on-demand distance vector) protocol or DSR (Dynamic Source Routing) protocol. In addition, the fields that are not directly related to the embodiment of the disclosure are not described in detail. Those skilled in the art can understand the meaning of these fields.

In an example, in step S101, available data channel information may be transmitted through the above mentioned MRREQ frame. The priority index value in the available data channel information may be determined according to the channel utilization of the radio coverage of the node, interference level and other features, which can be understood by those skilled in the art and will not be described in detail. For convenience, the priority index value may be standardized, that is, the scope of the priority index value may be defined between 0 and 1 inclusive.

In an example, in step S102, an adjacent node of the source node may receive the routing request signal transmitted from the source node. If the adjacent node is not a destination node, that is, the adjacent node is an intermediate node, the intermediate node may modify the available data channel information in the received routing request signal and transmit the modified available data channel information via the routing request signal. If the node receiving the modified available data channel information is not a destination node, it may again modify the available data channel information, and transmit via the routing request signal, until the routing request signal arrives at the destination node.

In an example, in step S102, the routing request signal may be MRREQ frame. The intermediate node may modify the data channel field in the MRREQ frame. In addition, the intermediate node may also modify the hop counting field, with the source ID field and the destination ID field unchanged. In an example, the intermediate node may replace the priority index value including the available data channel in the available data channel information to be received with the following value: the product of the priority index value of the available data channel and the priority index value of a data channel which is the same as the available data channel in the received available data channel information if there is such available data channel for the intermediate node; or zero if there doesn't exist the same available data channel as the available data channel in the received available data channel information for the intermediate node. For example, if the priority index value (hereinafter also referred to as weighted value) of the available channels 1, 2 and 3 obtained by the intermediate node (herein referred to as the first intermediate node) from the routing request signal received from the source node respectively are 0.75, 0.62 and 0.80, and the available channel of the first intermediate node itself also includes channels 1, 2 and 3, the priority index value thereof respectively are 0.51, 0.48 and 0.21, then the first intermediate node changes the priority index value of channels 1, 2 and 3 in the routing request signal to 0.38 (≈0.75×0.51), 0.30 (≈0.62×0.48), 0.17 (≈0.80×0.21) respectively. The first intermediate node transmits the modified available data channel information via the routing request signal. If the second intermediate node receives the routing request signal, and the available channel of the second intermediate node itself includes channels 1, 2 and 3, and the priority index value respectively are 0.48, 0.77 and 0.50, then the second intermediate node changes the priority index value of channels 1, 2 and 3 in the routing request signal to 0.18 (≈0.38×0.48), 0.23(≈0.30×0.77), 0.09 (≈0.17×0.50) respectively. In the above example, if only channels 1 and 2 are available at the second intermediate node and channel 3 is not available, and the priority index values of channels 1 and 2 respectively are 0.48 and 0.77, then the second intermediate node changes the priority index value of channels 1, 2 and 3 in the routing request signal to 0.18 (≈0.38×0.48), 0.23(≈0.30×0.77), and 0 (=0.17×0) respectively.

In an example, the intermediate node may record the node of previous hop for the routing request signal, in order to notify the previous hop of the agreed channel with the previous hop after determining the agreed channel. Those skilled in the art may record the node of previous hop with various methods, which will not be described in detail.

In an example, in step S103, the destination node may compute a new priority index value according to the priority index value of the available data channel in the available data channel information received from the source node or the intermediate node, the new priority index value may be as follows: the product of the priority index value of the available data channel and priority index value of a data channel which is the same as the available data channel in the received available data channel information if there exists such available data channel for the destination node; or zero if there doesn't exist the same available data channel as the available data channel in the received available data channel information at the destination node. Then the destination node may determine the available channel of the highest priority index value as the reserved data channel between the destination node and the source node. The reserved data channel also becomes the reserved data channel for communication between the destination node and each intermediate node. In a case the priority index values of a plurality of channels all are the highest, one channel may be arbitrarily chosen from the channels of highest priority index value as the agreed channel. For example, if the priority index values of the available channels 1, 2 and 3 obtained by the destination node from the routing request signal received from the intermediate node (or directly from the source node) are respectively 0.18, 0.23 and 0.09, and the available channel of the destination node also includes channels 1, 2 and 3, and the priority index values thereof are 0.66, 0.58 and 0.86, then the new priority index values of available channels 1, 2 and 3 computed by the destination node respectively are 0.12 (≈0.18× 0.66), 0.13(≈0.23×0.58), and 0.07 (≈0.09×0.86). Thus the destination node determines channel 2 of highest priority index value as the reserved channel for communication between the destination node and the source node or between the destination node and the intermediate node. In the example, all nodes in the routing from the source node to the destination node can use the same reserved data channel.

In an example, at step S104, the destination node notifies the intermediate node as a previous hop of an identification of the agreed data channel via a routing reply signal. The intermediate node as the previous hop of the destination node notifies the identification of the agreed data channel to a node which is the previous hop of the intermediate node as the previous hop of the destination node, until the source node is notified of the agreed data channel. In the process of forwarding the predetermined data channel back to the source node, a route to the destination node will be established along each node on the path. Each node may store a routing table therein. The routing table may include an identification of this communication, an identification of next hop and the reserved channel for communication between this node and next hop. Those skilled in the art may realize the routing table of the node with various ways upon reading the specification, which will not be described in detail. For example, those skilled in the art may refer to the implementation in such protocols as AODV and DSR.

In an example, the routing reply signal may be MRREP frame. The agreed channel ID field in the MRREP frame may carry an identification of the agreed data channel.

Through steps S101-S104, a route may be established between the source node and the destination node. Then the source node and the destination node may transmit data via the route. The process of data transmission between the source node and the destination node is known to those skilled in the art, and will not be described in detail.

Figure 2:
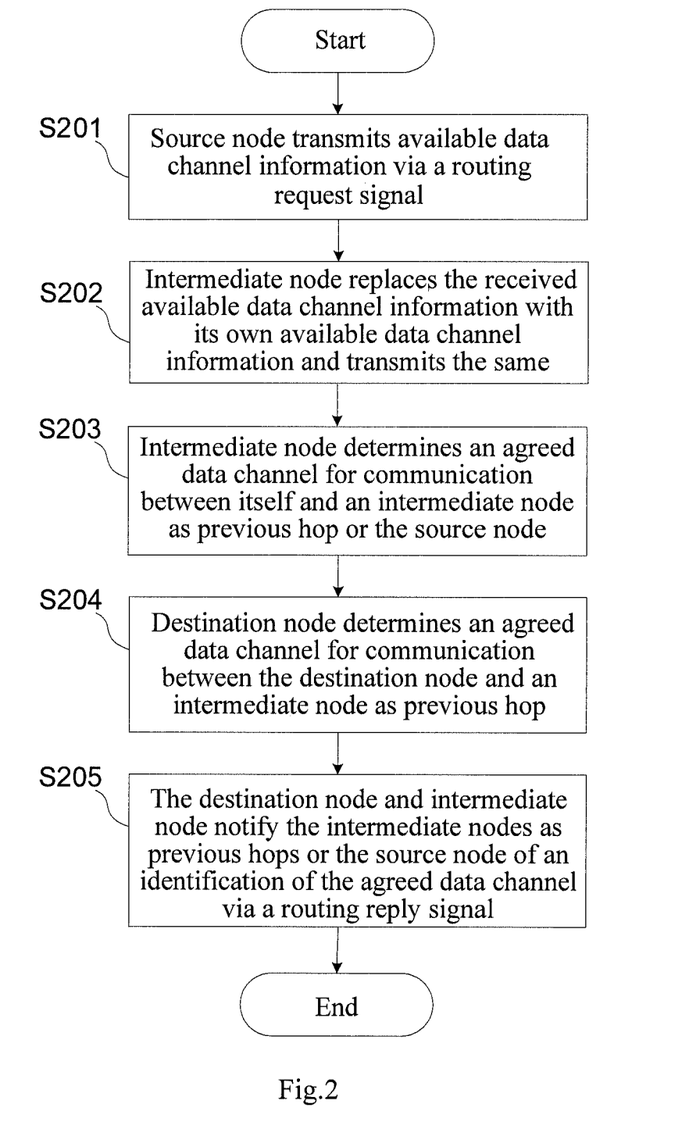
FIG. 2 illustrates a communication method used in a wireless communication network according to another embodiment of the disclosure.

FIG. 2 illustrates a communication method used in a wireless communication network according to another embodiment of the disclosure.

As shown in FIG. 2, the communication method used in a wireless communication network according to another embodiment of the disclosure starts from step S201.

In step S201, a source node transmits available data channel information via a routing request signal.

In step S202, an intermediate node replaces the received available data channel information with its own available data channel information, and transmits the modified available data channel information via the routing request signal.

In step S203, the intermediate node determines an agreed data channel for communication between itself and an intermediate node as a previous hop or the source node.

In step S204, the destination node determines an agreed data channel for communication between the destination node and an intermediate node as a previous hop.

In step S205, the destination node and the intermediate node notifies the intermediate nodes as previous hops or the source node of an identification of the agreed data channel via a routing reply signal.

Step S201 is similar to step S101 in FIG. 1, and will not be described in detail.

In an example, if the priority index value (hereinafter also referred to as weighted value) of the available channels 1, 2 and 3 obtained by the intermediate node (herein referred to as the first intermediate node) from the routing request signal received from the source node respectively are 0.75, 0.62 and 0.80, and the available channel of the first intermediate node itself also includes channels 1, 2 and 3, the priority index value thereof respectively are 0.51, 0.48 and 0.21, then the first intermediate node changes the priority index value of channels 1, 2 and 3 in the routing request signal to 0.51, 0.48 and 0.21 respectively. The first intermediate node transmits the modified available data channel information via the routing request signal. If the second intermediate node receives the routing request signal, and the available channel of the second intermediate node itself also includes channels 1, 2 and 3, and the priority index value respectively are 0.48, 0.77 and 0.50, then the second intermediate node changes the priority index value of channels 1, 2 and 3 in the routing request signal to 0.48, 0.77 and 0.50 respectively. In the above example, if only channels 1 and 2 are available at the second intermediate node, and channel 3 is not available, and the priority index values of channels 1 and 2 respectively are 0.48 and 0.77, then the second intermediate node changes the priority index value of channels 1, 2 and 3 in the routing request signal to 0.48, 0.77 and 0 respectively.

In an example, in step S203, the intermediate node may determine the agreed data channel for communication between itself and an intermediate node as a previous hop or the source node through the available data channel information of the previous hop and its own available data channel information. For example, the intermediate node may compute a new priority index value according to the priority index value of the available data channel in received the available data channel information of the previous hop, the new priority index value may be as follows: the product of the priority index value of the available data channel and the priority index value of a data channel which is the same as the available data channel in the received available data channel information if there is such available data channel for the intermediate node; or zero if there doesn't exist the same available data channel as the available data channel in the received available data channel information for the intermediate node. Then the channel with the highest newly computed priority index value is determined as the agreed data channel. In a case the priority index values of a plurality of channels all are the highest, one channel may be arbitrarily chosen from the channels of highest priority index value as the agreed channel. For example, the priority index values of the available channels 1, 2 and 3 obtained by the first intermediate node from the routing request signal received from the source node are respectively 0.75, 0.62 and 0.80, and the available channel of the first intermediate node itself also includes channels 1, 2 and 3, and the priority index values thereof are 0.51, 0.48 and 0.21, then the new priority index values of channels 1, 2 and 3 computed by the first intermediate node respectively are 0.38 (≈0.75×0.51), 0.30 (≈0.62×0.48), and 0.17 (≈0.80×0.21). Thus channel 1 of highest priority index value may be determined as the reserved channel for communication between the source node and the first intermediate node. Similarly, if the priority index values of the available channels 1, 2 and 3 obtained by the second intermediate node from the routing request signal received from the first intermediate node are respectively 0.51, 0.48 and 0.21, and the available channel of the second intermediate node includes channels 1, 2 and 3, and the priority index values thereof are 0.48, 0.77 and 0.50, then the new priority index values of channels 1, 2 and 3 computed by the second intermediate node respectively are 0.24 (≈0.51×0.48), 0.37 (≈0.48×0.77), and 0.11 (≈0.21× 0.50). Thus, the second intermediate node may determine channel 2 of highest priority index value as the reserved channel for communication between the first intermediate node and the second intermediate node.

In an example, in step S204, the destination node may determine an agreed data channel for communication between the destination node and an intermediate node as a previous hop according to the available data channel information received from the intermediate node as the previous hop and the available data channel information of the destination node itself. For example, the destination node may compute a new priority index value according to the priority index value of the available data channel in the received available data channel information of the previous hop, the new priority index value may be as follows: the product of the priority index value of the available data channel and the priority index value of a data channel which is the same as the available data channel in the received available data channel information if there is such available data channel for the destination node; or zero if there doesn't exist the same available data channel as the available data channel in the received available data channel information for the destination node. Then the channel with the newly computed highest priority index value may be determined as the agreed channel. In a case the priority index values of a plurality of channels all are the highest, one channel may be arbitrarily chosen from the channels of highest priority index value as the agreed channel. For example, the priority index values (herein also referred to as weighted value) of the available channels 1, 2 and 3 obtained by the destination node from the routing request signal received from the second node are respectively 0.48, 0.77 and 0.50, and the available channel of the destination node itself also includes channels 1, 2 and 3, and the priority index values thereof are 0.66, 0.58 and 0.86, then the new priority index values of channels 1, 2 and 3 computed by the destination node respectively are 0.32 ($\approx 0.48 \times 0.66$), 0.45 ($\approx 0.77 \times 0.58$)), 0.43 ($=0.50 \times 0.86$). Thus channel 2 of highest priority index value may be determined as the reserved channel for communication between the second intermediate node and the destination node.

In an example, in step S205, the destination node and the intermediate node respectively notify the source node or an intermediate node as a previous hop of the identification of the agreed data channel through a routing reply signal. For example, the destination node may notify the node which is the previous hop of the agreed data channel for communication between itself and the node which is the previous hop via a routing reply signal. In the process of forwarding a predetermined data channel to the node of previous hop by each node other than the source node, each node other than the destination node will establish a route to the node of next hop, thereby forming a complete route from the source node to the destination node. Each node may store a routing table therein. The routing table may include an identification of this communication, an identification of next hop and the reserved channel for communication with next hop. Those skilled in the art may realize the routing table of the node with various ways upon reading the specification, which will not be described in detail. For example, those skilled in the art may refer to the implementation in such protocols as AODV and DSR.

In an example, a routing reply signal may be MRREP frame. The agreed channel ID field of the MRREP frame may carry the identification of the agreed data channel.

Those skilled in the art should understand that in the embodiments shown in FIG. 1 and FIG. 2, the steps may not necessarily be executed exactly in the shown order. For example, in step S203 of FIG. 2, after determining the agreed channel for communication with the node of previous hop, an intermediate node may execute step S205, notify the node of the immediate previous hop of the agreed channel, without executing step S204.

According to the communication method of the embodiment of the disclosure, channel reservation and communication of the node is realized in a multi-channel peer network, enabling improvement of channel utilization and throughput of network. Furthermore, the control information overhead in the embodiment of the disclosure is small.

Figure 5:
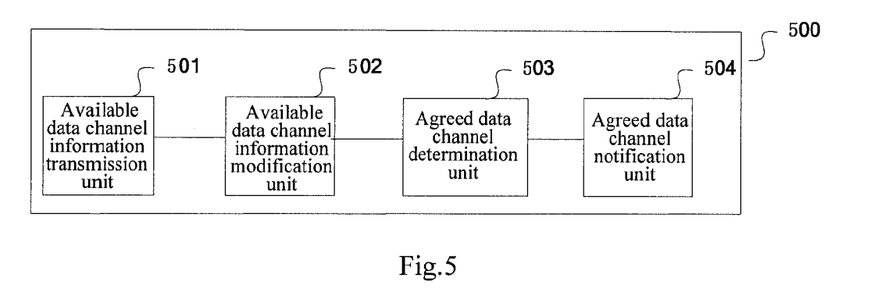
FIG. 5 illustrates a schematic view of a node used in a wireless communication network according to the embodiment of the disclosure.

The above mentioned communication method used in the wireless communication network according to the embodiment of the disclosure may, for example, be realized with the node used in the wireless communication network shown in FIG. 5.

FIG. 5 illustrates a schematic view of node used in wireless communication network according to the embodiment of the disclosure. The wireless communication network includes multiple peer nodes, the multiple peer nodes communicating with each other through a control channel and a plurality of data channels.

As shown in FIG. 5, node 500 used in the wireless communication network according to the embodiment of the disclosure includes an available data channel information transmission unit 501, an available data channel information modification unit 502, an agreed data channel determination unit 503 and an agreed data channel notification unit 504.

The available data channel information transmission unit 501 may be configured to transmit available data channel information via a routing request signal.

The available data channel information modification unit 502 may be configured to modify available data channel information received by a source node or an intermediate node, and transmit the modified available data channel information via a routing request signal.

The agreed data channel determination unit 503 may be configured to determine an agreed data channel for the communication between a destination node and a source node or between a destination node and an intermediate node, according to the available data channel information received from the source node or the intermediate node. That is to say, if the agreed data channel determination unit 503 is at the destination node, the agreed data channel determination unit 503 may determine the agreed data channel for communication between the destination node and the source node or between the destination node and the intermediate node.

The agreed data channel notification unit 504 may be configured to notify an intermediate node as a previous hop and/or the source node of an identification of the agreed data channel via a routing reply signal.

In an example, the available data channel information includes the identification of the available data channel and a respective priority index value.

In an example, the available data channel information modification unit 502 may replace the priority index value of the available data channel in the available data channel information received by the node at which the data channel information modification unit 502 is located with the following value: the product of the priority index value of the available data channel and the priority index value of a data channel which is the same as the available data channel in the received available data channel information if there is such a data channel for the node at which the data channel information modification unit 502 is located; or zero if there is not a data channel which is the same as the available data channel in the received available data channel information for the node at which the data channel information modification unit 502 is located.

In an example, the agreed data channel determination unit 503 may further determine an agreed data channel for the communication between itself and the intermediate node as a previous hop or the source node, according to the available data channel information received from the source node or the intermediate nodes together with its own available data channel information.

In one example, the available data channel information modification unit 502 may replace the received available data channel information with available data channel information of the node at which the available data channel information modification unit 502 is located.

In addition, in another example, the node 500 may further include an available data channel information receiving unit (not shown in the drawings) configured to receive the routing request signal from other nodes. In an example, the node 500 may further include an agreed data channel receiving unit (not shown in the drawings) configured to receive the routing reply signal from other nodes, the routing reply signal includes an identification of the agreed data channel.

By using the node of the embodiment of the disclosure, channel reservation and communication of the node may be realized in a multi-channel peer network, improving channel utilization and throughput of network. Furthermore, the control information overhead in the embodiment of the disclosure is small.

By reading the operation process of the above described communication method used in the wireless communication network according to the embodiment of the disclosure, how to realize the function of above described various parts of the node used in the wireless communication network shown in FIG. 5 becomes very clear. Therefore, for simplicity, how to realize the function of above described various parts will not be described in detail.

In addition, it is noted that though the node of the embodiment of the disclosure is described with reference to the schematic view shown in FIG. 5, those skilled in that art should understand that the schematic view shown in FIG. 5 is merely illustrative, but not a restriction of the scope of the disclosure. Those skilled in the art may change or modify the schematic view shown in FIG. 5 according to practical needs.

According to the embodiment of the disclosure, a wireless communication network is provided, which includes a plurality of peer nodes used in the wireless communication network according to the disclosure. According to the wireless communication network of the embodiment of the disclosure, channel reservation and communication of the node is realized in a multi-channel peer network, enabling the improvement of channel utilization and throughput of network. Furthermore, the control information overhead in the embodiment of the disclosure is small.

Though the disclosure and its advantages are described in detail, it should be understood that various change, substitution and alteration may be made without departing from the spirit and scope of the disclosure defined by the claims.

At last, it should be noted that in the description, relational terminologies such as the first and the second are merely used to differentiate one entity or operation from another entity or operation, without requiring or implying any such practical relation or order between those entities or operations. Moreover, terminologies "include", "comprise" or any other varieties are intended to encompass non-exclusive containment. Therefore, the process, method, article or device including a series of elements not only include those elements, but also include other elements not listed specifically, or elements inherent in the process, method, article or device. With no more restrictions, elements defined by sentence "include one . . . " do not exclude other same elements in the process, method, article or device including said elements.

Although the embodiment of the disclosure has been described in detail with reference to the accompanying drawings, it should be noted that the above described embodiments are merely used to illustrate the disclosure, without restricting the disclosure. For those skilled in the art, various modifications and alterations may be made without departing from the spirit and scope of the disclosure. Therefore, the scope of the disclosure is merely defined by the claims and its equivalents.

Notes:

Note 1. A communication method used in a wireless communication network, the wireless communication network comprising a plurality of peer nodes, the plurality of nodes communicating with each other through a control channel and a plurality of data channels, the communication method comprising:

transmitting, by a source node among the plurality of nodes, available data channel information via a routing request signal;

modifying, by an intermediate node among the plurality of nodes, available data channel information received by the source node or the other intermediate nodes, and transmits the modified available data channel information via a routing request signal;

determining, by a destination node among the plurality of nodes, an agreed data channel for communication between the destination node and the source node or between the destination node and the intermediate node, according to the available data channel information transmitted from the source node or the intermediate node; and notifying, by the destination node and/or the intermediate node, an intermediate node as a previous hop and/or the source node of an identification of the agreed data channel via a routing response signal.

Note 2. The communication method of Note 1, wherein the available data channel information comprises the identification of the available data channel and a respective priority index value.

Note 3. The communication method of Note 2, wherein modifying by the intermediate node among the plurality of nodes the available data channel information received comprises: replacing the priority index value of the available data channel in the available data channel information received with the following value:

a production of the priority index value of the available data channel and the priority index value of a data channel which is the same as the available data channel, if there is such a data channel for the intermediate node; or zero, if there is not a data channel which is the same as the available data channel for the intermediate node.

Note 4. The communication method of Note 2, further comprising:

determining, by the intermediate node, an agreed data channel for the communication between the intermediate node itself and the intermediate nodes passed through by the routing or the source node, according to the available data channel information received from the source node or the other intermediate nodes together with the available data channel information of the intermediate node itself; and notifying, by the intermediate node, the intermediate node as previous hop and/or the source node of the agreed data channel via the routing response signal.

Note 5. The communication method of Note 4, wherein modifying by the intermediate node among the plurality of nodes the available data channel information received by the source node or the other intermediate nodes comprises:

replacing the available data channel information received with an available data channel information of the intermediate node.

Note 6. A node used in a wireless communication network, the wireless communication network comprising a plurality of peer nodes, the plurality of nodes communicate through a control channel and a plurality of data channel, the node comprising:

an available data channel information transmission unit configured for transmitting available data channel information via a routing request signal;

an available data channel information modification unit configured for modifying available data channel information received by a source node or an intermediate node, and transmitting the modified available data channel information via a routing request signal;

an agreed data channel determination unit configured for determining an agreed data channel for the communication between a destination node and a source node or between a destination node and an intermediate node, according to the available data channel information transmitted from the source node or the intermediate node; and an agreed data channel notification unit configured for notifying an intermediate node as a previous hop and/or the source node of an identification of the agreed data channel via a routing response signal.

Note 7. The node of Note 6, wherein the available data channel information comprises the identification of the available data channel and a respective priority index value.

Note 8. The node of Note 7, wherein the available data channel information modification unit is configured for replacing the priority index value of the available data channel in the available data channel information received with the following value:

a production of the priority index value of the available data channel and the priority index value of a data channel which is the same as the available data channel, if there is such a data channel for the intermediate node; or zero, if there is not a data channel which is the same as the available data channel for the intermediate node.

Note 9. The node of Note 7, wherein the agreed data channel determination unit is further configured for determining an agreed data channel for the communication between the node itself and the intermediate nodes as a previous hop or the source node, according to the available data channel information received from the source node or the other intermediate nodes together with the available data channel information of the node itself.

Note 10. The node of Note 9, wherein the available data channel information modification unit is configured for replacing the available data channel information received with an available data channel information of the node.

Note 11. A wireless communication network, comprising a plurality of peer nodes according to any of Notes 6-10.

The invention claimed is:

1. A communication method used in a wireless communication network, the wireless communication network comprising a plurality of peer nodes, the plurality of peer nodes communicating with each other through a control channel and a plurality of data channels, the communication method comprising:

transmitting, by a source node among the plurality of peer nodes, available data channel information indicating information on a plurality of available data channels via a routing request signal;

modifying, by an intermediate node among the plurality of peer nodes, the available data channel information received by the source node or the other intermediate nodes, and transmitting the modified available data channel information via the routing request signal;

selecting, by a destination node among the plurality of peer nodes, an agreed data channel for communication between the destination node and the source node or between the destination node and the intermediate node from the plurality of available data channels, according to the available data channel information transmitted from the source node or the intermediate node; and notifying, by the destination node, the source node of an identification of the agreed data channel via a routing response signal; or notifying, respectively by the destination node and the intermediate node, a node as a previous hop thereof of the identification of the agreed data channel via the routing response signal, wherein the available data channel information comprises the identification of each of the plurality of available data channels and a respective priority index value, modifying the available data channel information comprises modifying the priority index value of available data channels, and selecting the agreed data channel for communication between the destination node and the source node or between the destination node and the intermediate node comprises: computing, by the destination node, a new priority index value according to the priority index value of available data channel received from the source node or the intermediate node, and determining the available channel of the highest priority index value as the agreed data channel.

2. The communication method of claim 1, wherein modifying by the intermediate node among the plurality of peer nodes the available data channel information received comprises: replacing the priority index value of the each of the plurality of available data channels in the available data channel information received with the following value:

a production of the priority index value of the each of the plurality of available data channels and the priority index value of a data channel which is a same as the each of the plurality of available data channels, if there is the data channel for the intermediate node; or zero, if there is not the data channel which is the same as the each of the plurality of available data channels for the intermediate node.

3. The communication method of claim 1, further comprising:

selecting, by the intermediate node, the agreed data channel for the communication between the intermediate node itself and the intermediate nodes passed through by the routing request or the source node from the plurality of available data channels, according to the available data channel information received from the source node or the other intermediate nodes together with the available data channel information of the intermediate node itself; and notifying, by the intermediate node, the intermediate node as previous hop or the source node of the agreed data channel via the routing response signal.

4. The communication method of claim 3, wherein modifying by the intermediate node among the plurality of peer nodes the available data channel information received by the source node or the other intermediate nodes comprises replacing the available data channel information received with the available data channel information of the intermediate node.

5. A node used in a wireless communication network, the wireless communication network comprising a plurality of peer nodes, the plurality of peer nodes communicate through a control channel and a plurality of data channel, the node comprising:

an available data channel information transmission unit configured to transmit available data channel information indicating information on a plurality of available data channels via a routing request signal;

an available data channel information modification unit configured to be connected to the available data channel information transmission unit, modify the available data channel information received by a source node or an intermediate node, and transmit the modified available data channel information via the routing request signal;

an agreed data channel determination unit configured to be connected to the available data channel information modification unit, select an agreed data channel for the communication between a destination node and the source node or between the destination node and the intermediate node from the plurality of available data channels, according to the available data channel information transmitted from the source node or the intermediate node, and transmit an identification of the agreed data channel to an agreed data channel notification unit; and the agreed data channel notification unit configured to be connected to the agreed data channel determination unit, receive the identification of the agreed data channel from the agreed data channel determination unit and notify the intermediate node as a previous hop or the source node of the identification of the agreed data channel via a routing response signal, wherein the available data channel information comprises the identification of each of the plurality of available data channels and a respective priority index value, the available data channel information modification unit modifies the priority index value of available data channels, and the agreed data channel determination unit computes a new priority index value according to the priority index value of the available data channel received from the source node or the intermediate node, and determines the available channel of the highest priority index value as the agreed data channel.

6. The node of claim 5, wherein the available data channel information modification unit replaces the priority index value of the each of the plurality of available data channels in the available data channel information received with the following value:

a production of the priority index value of the each of the plurality of available data channels and the priority index value of a data channel which is a same as the each of the plurality of available data channels, if there is the data channel for the intermediate node; or zero, if there is not the data channel which is the same as the each of the plurality of available data channels for the intermediate node.

7. The node of claim 5, wherein the agreed data channel determination unit further select the agreed data channel for the communication between the node itself and the intermediate nodes as the previous hop or the source node from the plurality of available data channels, according to the available data channel information received from the source node or the other intermediate nodes together with the available data channel information of the node itself.

8. The node of claim 7, wherein the available data channel information modification unit replaces the available data channel information received with the available data channel information of the node.

* * * * *